United States Patent [19]
Sovish et al.

[11] 3,899,807
[45] Aug. 19, 1975

[54] HEAT RECOVERABLE ARTICLES AND METHOD OF MAKING SAME

[75] Inventors: Richard C. Sovish, Los Altos; Michael B. Sullivan, Cupertino; Judson D. Wetmore, San Mateo, all of Calif.

[73] Assignee: Raychem Corporation, Menlo Park, Calif.

[22] Filed: Apr. 5, 1973

[21] Appl. No.: 348,348

Related U.S. Application Data

[62] Division of Ser. No. 130,678, April 2, 1971, abandoned.

[52] U.S. Cl............. 24/255 C; 24/265 H; 138/168; 24/16 PB; 24/DIG. 4; 156/86; 156/215; 156/216; 264/22; 264/230; 204/159.17; 156/163; 156/83; 428/124; 428/212; 428/913
[51] Int. Cl............................................. B32b 3/02
[58] Field of Search ........... 264/171, 230, 168, 342, 264/285, 280, 22; 24/16 R, 16 PB, 25 SC; 161/149, 102, 104, 39, 166; 156/86, 215, 216, 217, 218; 138/168

[56] References Cited
UNITED STATES PATENTS

| | | | |
|---|---|---|---|
| 3,416,991 | 12/1968 | Yoshimura........................ | 161/101 |
| 3,542,077 | 11/1970 | Muchmore.................... | 174/DIG. 8 |
| 3,681,189 | 8/1972 | Matsui et al........................ | 246/171 |

*Primary Examiner*—George F. Lesmes
*Assistant Examiner*—R. J. Roche
*Attorney, Agent, or Firm*—Lyon and Lyon

[57] ABSTRACT

This patent describes laminated articles which are heat recoverable in involute fashion to an overlapping, generally cylindrical configuration and which are useful as wrap-around sleeves for wires, cables, cable splices and the like. Also described are laminated articles initially heat recoverable to an elongate S-shaped configuration, which latter can be wrapped about an elongate substrate, the edge portions thereof interlocked, and heat recovered to form a protective closure. The articles of the invention comprise a first lamina existing in latent compression relative to a second, adjacent lamina such that upon the application of heat the second lamina urges recovery of the first lamina in involute fashion. Means are disclosed whereby the exterior faces of the articles of the invention can be rendered adherable one to the other under the conditions of heat recovery, such that upon involute recovery a bonded, integral article is formed. The involutely heat recoverable articles can be formed of, e.g., polymeric or metallic laminae by a wide variety of processes, the particulars of which are set out herein.

4 Claims, 15 Drawing Figures

RICHARD C. SOVISH
JUDSON DOUGLAS WETMORE
MICHAEL B. SULLIVAN
INVENTORS.

BY *Lyon*Lyon*
ATTORNEYS.

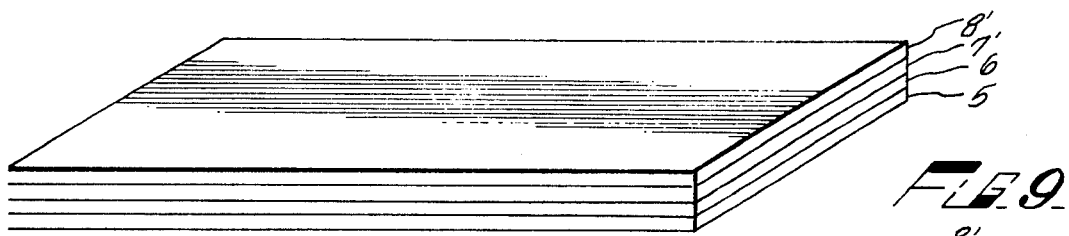
FIG.9.
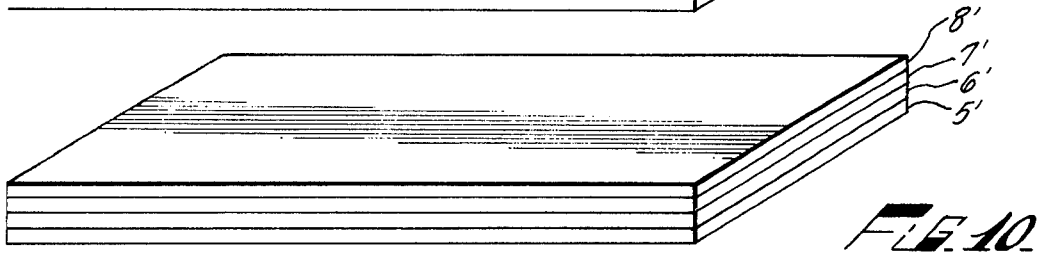
FIG.10.
FIG.11.
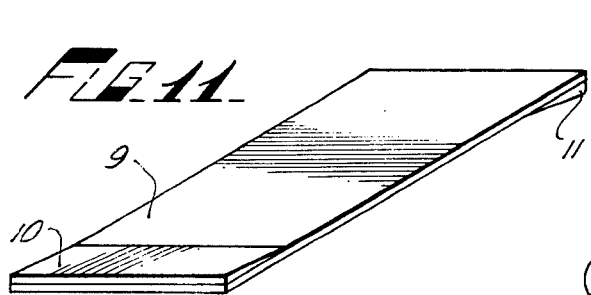
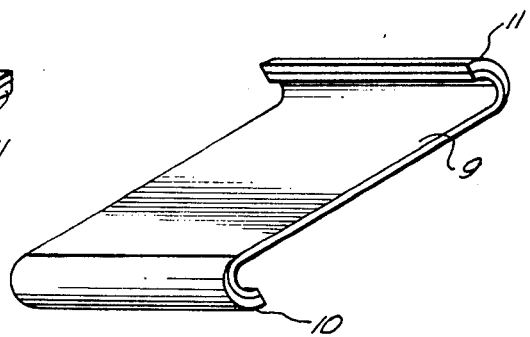
FIG.12.
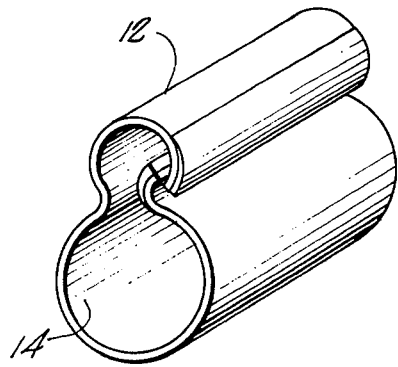
FIG.13.
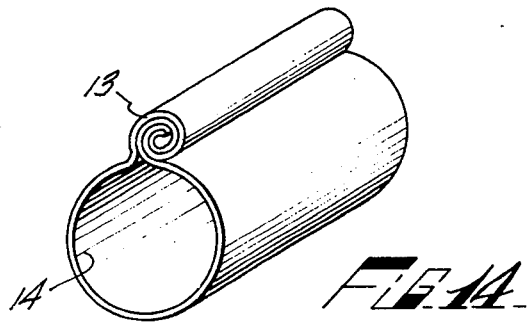
FIG.14.
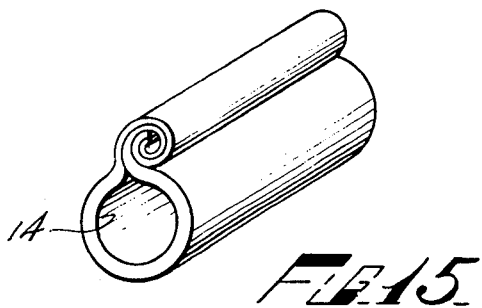
FIG.15.
RICHARD C. SOVISH
JUDSON DOUGLAS WETMORE
MICHAEL B. SULLIVAN
INVENTORS.
BY *Lyon_Lyon*
ATTORNEYS

HEAT RECOVERABLE ARTICLES AND METHOD OF MAKING SAME

This is a division of application Ser. No. 130.678, filed Apr. 2, 1971, now abandoned.

FIELD OF THE INVENTION

This invention relates to laminated heat recoverable article suitable for use as a wrap-around sleeve which can easily and conveniently be installed on cables, wire splices and the like.

BACKGROUND OF THE INVENTION

Heat recoverable articles have found widespread acceptance in employment as seals or other closures in the repair and protection of generally tubular conduits such as pipe joints and electrical conductors. Typically, such articles have comprised heat recoverable tubular sleeves which describe in cross-section an integral, closed curve. Among the heat recoverable sleeves so-configured are those produced according to U.S. Pat. Nos. 3,086,242 and 2,027,962, the disclosures of which are incorporated herein by reference.

While such sleeves are generally satisfactory in many applications, they require first the provision of a free end in the conduit to be protected, over which the sleeve can be slipped. That manner of application is often manifestly inconvenient. For example, where a secondary electrically conductive line is to be tapped or spliced into a primary carrier, it is desirable that the splice be protected by application of a sleeve which does not require for its placement the disengagement of the existing carrier. Again, where a conduit carrying gas, water or other fluid cracks, it is desirable to stop the resultant leakage by application of a sleeve which for its placement does not require creation of a break in the pipeline and removal of the damaged conduit therefrom. To the same extent, it is desirable to repair cracks in cable insulation without necessitating the provision of a free end by breaking the cable.

It has been proposed to form wrap-around closures which for their application do not require a free end of the substrate to be protected, the closures being formed from a heat recoverable tube which is longitudinally slit, placed about the substrate, edge-joined by mechanical means, and heat-recovered to a snug, sealant configuration. See for example U.S. Pat. Nos. 3,455,336 and 3,379,218 the disclosures of which are incorporated herein by reference. While those closures have to a great degree lessened the difficulties related above, the need remains for a wraparound heat recoverable sleeve which can be quickly and conveniently applied without resort to the additional positive steps required for mechanical joinder of closure edges.

BRIEF SUMMARY OF THE INVENTION

According to this invention, there is provided a laminated article adapted for ready application as a wrap-around sleeve, the article having two primary faces and comprising a first lamina and second lamina, the first lamina being in latent compression relative to said second lamina; the article being heat recoverable in involute fashion to an overlapping generally cylindrical configuration. In preferred embodiments, overlapping portions of the primary faces are rendered adherable one to the other under the conditions of heat recovery.

According to a particular embodiment of the invention, there is provided a laminated article the edge portions of which are heat recoverable in an initial stage such that the article assumes in cross-section the shape of an elongate "S." The article so recovered can be deployed around a substrate to be protected, the arcuate edge portions thereof positioned in interlocking relation, and heat applied to the interlocked edge portions causing them to further heat recover in interspiraling fashion to form a bonded seam resistant to separation in service.

One object of this invention is to provide a heat recoverable article which, unlike a typical heat shrink sleeve, does not require for its application to a substrate the presentation of a free end thereof.

Another object is to provide a heat recoverable article which will involutely curl upon application of heat.

A further object of the invention is the provision of a wrap-around closure which can be made fast without resort to mechanical means.

Yet another object of the invention is to provide a heat recoverable article which will involutely curl upon application of heat to form a self-sealing, generally tubular protective covering.

These and other objects and advantages of the invention will become apparent upon reference to the following detailed description and to the accompanying drawings (not to scale) in which:

FIGS. 7–10 are perspective views of successive stages in the manufacture of a second embodiment of the invention.

FIGS. 11–15 are perspective views of successive stages in the manufacture and heat recovery of a third embodiment of the invention.

DETAILED DESCRIPTION OF THE INVENTION

Figure 1:
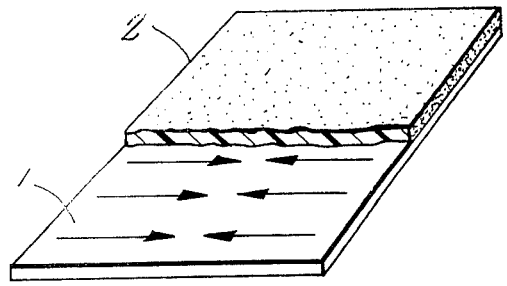
FIGS. 1 and 2 are perspective views, partially in cross-section, of a laminate according to this invention before and during heat recovery, respectively.

An essential property of the laminated articles of the invention is the ability to curl in involute fashion upon the application of heat. As used herein, "involute" refers to movement by which there is formed or a state in which the article so formed exists in the configuration of a closed spiral, i.e., a spiral in which overlapping portions are in abutting relation. That property is provided by forming a first lamina adjacent one face of a laminate and in latent compression relative to a second lamina adjacent the opposite face of the laminate. During heat recovery, at which time the latent compression of the first lamina manifests itself, the second lamina restrains the first from linear recovery and urges recovery in involute fashion. The articles of the invention are generally two dimensionally defined, i.e., their thickness is small relative to width and length and hence the "faces" or "primary faces" referred to herein are defined in area as the product of width and length. A typical laminate according to the invention is depicted in FIG. 1, wherein the compression referred to is represented by the arrows on lamina 1. Layer 1 is an expanded, heat recoverable material, whereas layer 2 is, in the broadest sense, comprised of a material tending to restrain the recovery of layer 1 to its original state upon the application of heat. Preferably, layer 1 is essentially unidirectionally expanded, i.e., not biaxially oriented. When the laminate is heated to the point at which layer 1 begins to recover, the combination of recovery and restraint acts to produce the involute recovery in progress in FIG. 2.

Briefly then, the instant invention utilizes a layer which has been dimensionally changed from an original heat stable configuration to a dimensionally heat unstable configuration tending to move in the direction of its original configuration upon the application of heat alone (more simply, a heat recoverable layer), as part of a sleeve or closure article. In general, such a part is made of a material capable of having plastic or elastic memory imparted thereto and is capable of changing dimension to assume a heat stable condition upon the application of heat alone. Examples of such heat recoverable materials are found in Currie U.S. Pat. No. 2,027,962 and Cook et al. U.S. Pat. No. 3,086,242, the disclosures of which are incorporated herein by reference. One method of making a heat recoverable material consists in exposing a thermoplastic material to an amount of heat which is insufficient to allow the material to melt but sufficient to allow the molecular structure to become distorted; and then distorting the material to a new configuration and cooling or quenching the material in its distorted state. Subsequent increases in temperature sufficient to reduce the locked-in stresses caused by the initial plastic deformation will cause the article to tend to recover to its initial state. The material has had imparted to it "plastic memory."

Another manner in which heat recoverable materials can be made involves first the formation of a polymeric article in a particular configuration, followed then by cross-linking of the polymer. The cross-linking can be effected by chemical means, e.g., with peroxides, or by high energy ionizing radiation, or by combinations of the two. Radiation employed can be of various types including charged particles, i.e., beta and alpha, neutral particles, i.e., neutrons, and electromagnetic, i.e., gamma and ultraviolet, as is well known. Subsequent heating of the material will melt the crystals in a crystalline thermoplastic material or significantly lessen other internal molecular forces such as hydrogen bonding or dipole-dipole interactions to an extent sufficient to allow distortion of the product. Unlike the impartation of plastic memory to a non-cross-linked material, close temperature control is not required in this instance because the cross-linked material does not flow at elevated temperatures. Upon quenching of the heated and distorted article, there is obtained a product which remains in its distorted shape while at room temperature, due to the reformation of strong interchain forces such as crystallinity which at low temperatures dominate the contrary stresses resulting from cross-linking. Upon reheating, the cross-link forces become dominant and the material tends to recover to its original cross-linked geometry.

Means alternative to cross-linking exist whereby heat recoverability can be imparted to a material, e.g., an expanded and quenched lamina which prior to expansion has in the course of its manufacture in a particular configuration undergone a crystalline orientation will, upon application of heat, tend to recover to the said configuration as the forces imparted by orientation become ascendant.

Herein, unless superfluous in context, the term "expanded" is employed in the sense customary in the heat recovery industry — namely, with reference to heating above a transition temperature, distorting to a new dimension, and cooling to below the transition temperature while holding the article in the new dimension.

In any case, the heat recoverable materials suitable for this invention include all those which when heated above their transition temperature (i.e., crystalline melting temperature or glass transition temperature) but to less than their degradation temperature tend to recover toward some prior, heat stable state. As used herein, the terms crystalline melting point and crystalline melting temperature are considered to be synonymous as representing the temperature or temperature range at or within which crystalline or a cross-linked crystalline polymeric material changes from the crystalline to the amorphous state. Glass transition temperature and glass transition point are considered synonymous as representing the temperature or temperature range at or within which a hard, amorphous material softens.

Since the heat recoverable materials employed in the instant invention can exhibit either plastic memory or elastic memory, the two terms are used interchangeably herein and are intended to be mutually inclusive. Among the materials to which heat recoverability can be imparted by cross-linking, orientation or plastic deformation are polyolefins, e.g., polyethylene, polypropylene, polybutene, various copolymers of ethylene, propylene and butene, polyvinyl halides, e.g., polyvinyl chloride; polyvinylidene halides, e.g., polyvinylidene fluoride and chloride; polyacrylates; polyamides, e.g., nylon 6 or nylon 66; polyesters, e.g., polyethylene terephthalate; fluorocarbon polymers, e.g., polytetrafluoroethylene, vinylidene fluoride-hexafluoropropene copolymers, ionomers, polyurethanes and other materials such as epoxy resins.

Given a first lamina of heat recoverable material like those described above, it is necessary to provide in the laminates of the invention a second, relatively non-heat recoverable lamina. The relatively non-heat recoverable lamina will act as a restraint against linear recovery, and will instead urge recovery in an involute, inwardly curling manner. The relatively non-heat recoverable second lamina is bondable to the first lamina, preferably self-bonding thereto, and most preferably self-bonding thereto under the conditions of heat recovery. Where necessary and as discussed below, adhesive compositions or treatments are employed so that the opposite faces of the composite structure which are presented to one another during heat recovery are bonded one to the other in adhesive or integrally fused condition. The relatively non-recoverable material can be a polymeric material, whether cross-linked or not cross-linked. In the latter instance, it is necessary that the relatively non-recoverable lamina have a transition temperature substantially greater than i.e., greater by about 5°C than the transition temperature of the heat recoverable layer. Of course, the polymeric materials used in the instant invention can additionally contain additives which enhance or retard radiation cross-linking as desired, plasticizers, fillers, and other addends conventionally employed in the plastics art.

The heat recoverable articles of the invention can be prepared in a great many different configurations, depending upon the ultimate use to which the article will be put, and by a wide variety of methods.

Figure 2:
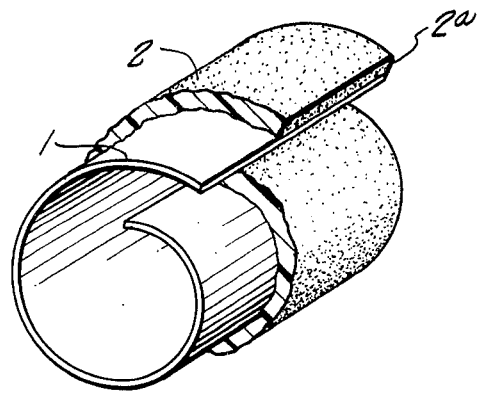
Figure 3:
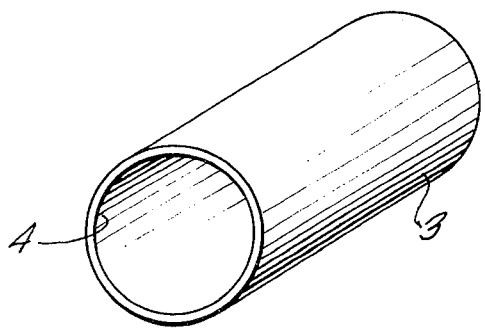
FIGS. 3–6 are perspective views of successive stages in the manufacture and heat recovery of one embodiment of this invention.

With reference to FIG. 1, one suitable method involves the lamination of an unexpanded non-cross-linked polymer layer 2 to layer 1 which latter has first been cross-linked, as by radiation, and expanded. In this instance, the melting point of the layer 2 should be greater than the recovery temperature of layer 1 so that recovery can be had at a temperature below that at which layer 1 is freed of the restraint imposed by layer 2 and enabled to recover linearly rather than involutely as shown in FIG. 2.

Generally, the difference in melting points between the two layers has ranged from about 15°C to as much as 50°C. By choosing the material of layer 2 such that its melting point is in fact attained during the heat application cycle but only after involute curling has occurred by reason of forces generated at temperatures less than the melting point of 2, the non-expanded layer. 2 can be caused to melt and flow upon curling of the overall structure, aiding bond formation. In this case, as recovery progresses the leading edge portion 2a can be turned in upon itself to promote bonding. Alternatively, there can be provided a second non-expanded layer (not shown) adjacent the opposite face of the expanded layer 1 and having a melting point equal to or less than the transition temperature of the other non-expanded layer, whereupon the melt and flow of the two non-expanded layers after curling promotes the formation of an integral bond.

Of course, the structure of FIG. 1 can additionally embody on one or both of its outer faces a coating of a compatible adhesive, e.g., "Zetafax" ethylene-acrylic acid ester copolymer adhesive for polyethylene expanded and non-expanded layers. Again, a piece of solder and flux can be affixed as by adhesive to layer 1 so that upon heat recovery about a wire splice or the like the solder fuses to secure the splice in a manner akin to that disclosed in Wetmore U.S. Pat. No. 3,243,211. In such case, naturally the solder and flux are affixed at a distance from one end of the recoverable article sufficient to insure that upon recovery to a generally cylindrical configuration the solder will be presented to a splice or the like enclosed within the interior of the cylinder — e.g., adjacent the end which is within recovered article.

As an alternative to the differential melting point approach outlined above, the non-cross-linked non-expanded layer can be composed of a material whose viscosity is greater than that of the heat recoverable material at the temperature of recovery. As the expanded lamina recovers, the restraint of the high viscosity unexpanded layer causes recovery to occur in involute fashion. A particular advantage of the differential viscosity approach is that recovery can occur above the crystalline melting point of both laminae, so that contact between the layers engendered by involute recovery results in an intimate bond which imparts a heat seal to the ultimate sleeve. Of course, the differential viscosity and melting point approaches can be combined if desired.

As an alternate to both of the above methods, the non-expanded lamina can be cross-linked. In this case, it is not necessary that the transition points of the two lamina differ substantially. The cross-linked non-expanded layer is not significantly affected in its purpose by raising of the expanded layer to above its transition temperature and the former layer continues to urge reocvery in involute rather than, e.g., linear fashion. The relatively non-heat recoverable layer in this instance can be cross-linked as by irradiation before lamination to the expanded layer. Since cross-linking renders polymeric materials more difficulty adherable one to the other, it may be necessary in this case to employ high pressure lamination aided by the interposition of, e.g., an adhesive layer or peroxide solution between the two laminae sought to be joined. Alternatively, a non-cross-linked layer can be laminated to a cross-linked expanded layer, and the the former layer then subjected to cross-linking, as by irradiation or exposure to chemical cross-linking agents, without further cross-linking the latter layer to an extent which "overrides" the elastic memory thereof.

In another embodiment, the relatively non-heat recoverable layer can be disposed on the cross-linked, expanded layer by solution coating or solution polymerization thereof. The solution applied to the expanded layer can comprise cross-linked polymer, or can be of a room temperature cross-linking composition, e.g., an epoxy resin or a polyester-toluene diisocyanate blend. If desired, polymers existing in non-cross-linked state after disposition on the expanded layer can be cross-linked by e.g., radiation.

Figure 4:
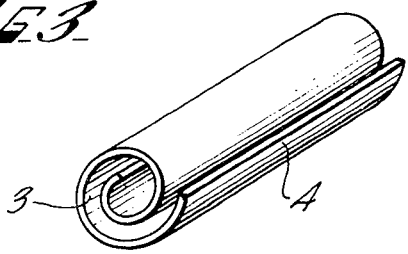
Figure 5:
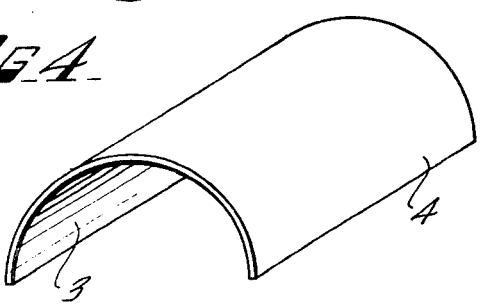
Figure 6:
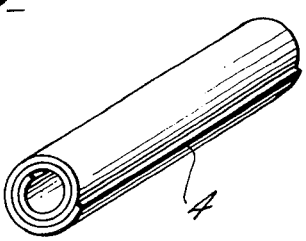

In forming the involutely heat recoverable articles of the invention, advantage can be taken of laminates which are heat recoverable in their commercially available form. For example, there is disclosed in British Pat. No. 1,033,959 (whose disclosure is expressly incorporated herein by reference) a dual walled tubing the outer wall of which is a relatively infusible, cross-linked material, the inner wall being a relatively fusible uncross-linked material. The property of heat recoverability is imparted to the dual walled tubing by a process of expansion and cooling like that disclosed in Cook et al. U.S. Pat. No. 3,086,242. Such dual walled tubing is available from the Raychem Corporation under the tradename "Thermofit SCL" tubing. FIGS. 3–6 depict in successive stages one manner in which such walled tubing can be rendered involutely heat recoverable and so recovered. with reference to FIG. 3, there is depicted tubing have relatively infusible, cross-linked outer wall 3 and relatively fusible non-cross-linked inner wall 4, the tubing having been expanded radially outwardly and cooled in the expanded state to impart elastic memory which upon the application of heat causes the article to recover radially inwardly. In FIG. 4, the article of FIG. 3 has been longitudinally slit, placed in an "inside-out" spiral configuration, and additionally cross-linked by irradiation such that after distortion and cooling, the article will upon the application of heat tend to recover to its spiral configuration rather than to the configuration depicted in FIG. 3. The additionally cross-linked article can now be distorted outwardly to a flat or, as is shown in FIG. 5, a concave state and cooled to lock in stress produced by the distortion. Subsequently, as is shown in FIG. 6, the article can be subjected to heat sufficient to release the captive stresses of the article in FIG. 5, whereupon the article will heat recover in involute fashion to the overlapping, generally cylindrical configuration depicted in FIG. 6. Of course, recovery to the state shown in FIG. 6 will in accord with the intendment of the invention occur about an elongate substrate intended to be protected (not shown). As opposed to further irradiating the longitudinally split sleeve while in the spiral configuration of FIG. 4, the longitudinally split sleeve can be wholly flattened out to present the uncrosslinked wall 4 to cross-linking radiation. However, since in the last instance the article does not "remember" a spiral configuration, it can happen that upon application of heat the distorted article will curl in double involute fashion, i.e., by turning upon itself from either edge. This can be avoided and the involute, overlapping cylindrical configuration of FIG. 6 be obtained by differential heating such that one edge portion of the article will undergo an initially greater change in dimension than the other edge portion. Such differential heating is generally desirable with regard to the majority of the embodiments of the instant invention, and can be accomplished by means conventional in the heat recovery industry.

Another manner in which such dual-walled tubing can be employed in this invention comprises extruding onto the cross-linked wall thereof a polymer uncross-linked relative thereto which is infusible at the recovery temperatuve, radially expanding the formed multi-walled tube to render the cross-linked polymer heat recoverable, and longitudinally splitting the formed heat recoverable article. At recovery temperatures the fusible polymer presents no restraint to recovery, while the restraint exerted by the infusible polymer occasions involute recovery of the cross-linked polymer layer.

Another alternate method for constructing involutely heat recoverable articles of the invention comprises the extrusion of a suitable polymer or copolymer onto an expanded cross-linked tube. Preferably, such extrusion is effected onto an SCL type dual walled, expanded construction like that discussed above. In such extrusion, it is often the case that the heat required for good adhesion at the interface of the substrate tubing and the extruded polymer is such that the expanded, substrate tubing will tend to prematurely recover radially inwardly. This tendency can be countered by partially filling the tubing in a section moving through the die onto which an extrusion is being made with a liquid such as mercury which prevents the expanded tube from collapsing while in the expanded state. Alternatively, air pressure can be employed to build up a sufficient head of pressure to prevent the tubing from collapsing. Again, the heat requirement for good adhesion can be reduced by coating the expanded, substrate tubing with a solution such as a peroxide which will degrade under the conditions of extrusion giving vulcanization at the said interface.

Figure 7:
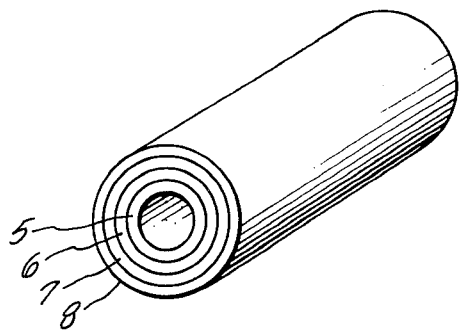
Figure 8:
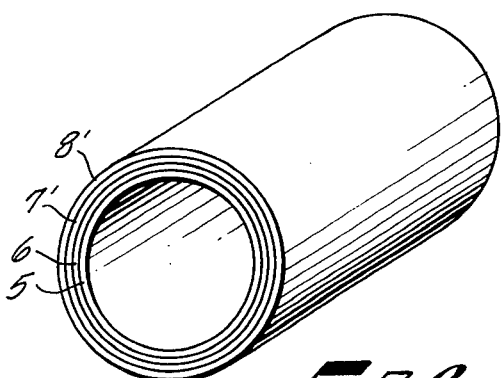

FIGS. 7-10 illustrate in successive stages another means by which sequential extrusion can be employed to prepare involutely heat recoverable articles of the invention. FIG. 7 illustrates in perspective a multi-walled tube which has been built up by sequential extrusion of the layers 5, 6, 7 and 8, commencing with substrate tubing 5. In the illustrated embodiment, the inner wall 5 and outer wall 8 of the multiwalled tube of FIG. 7 are composed of irradiation degradable polymer such as e.g., butyl rubber or polypropylene. The layer 7 is an expansible polymeric material susceptible to cross-linking and to the impartation of elastic memory. The layer 6 is composed of a polymeric material less susceptible to cross-linking by exterior radiation by reason of its position in the overall structure and, optionally, by the incorporation therein of antirads. The outer walls of the composite sleeve of FIG. 7 are then subjected to cross-linking dosages of radiation, and the irradiated structure is expanded radially and cooled in expanded state to form the heat recoverable article of FIG. 8. In FIG. 8 the layer 8 has become the irradiation degraded polymeric layer 8'. The layer 7 has become the cross-linked heat recoverable layer 7'. Because of the radiation attenuating effect of outer walls 8 and 7, and optionally because of the incorporation of the antirads mentioned above, the layer 6 has undergone little or no cross-linking in the expanded article of FIG. 8. Similarly, the layer 5 has been substantially unaffected by radiation. The heat recoverable sleeve is then longitudinally split, deformed as shown in FIG. 9, and is then subjected to additional cross-linking radiation on the bottom side thereof. The last-mentioned step causes the degradation of layer 5 to form irradiation degraded polymeric layer 5'. At the same time, the layer 6 is now subjected to sufficient radiation to form the cross-linked polymer layer 6'. When differentially heated, the structure of FIG. 10 will involutely curl and the opposed faces of irradiation degraded polymer will be presented one to the other, whereupon an overlapping, integrally bonded structure will result.

While the heat recoverable wrap-around sleeves of the invention have to this point been discussed primarily with regard to polymeric laminates, it will be apparent to the art-skilled that other materials capable of having the property of heat recoverability imparted thereto can be employed in the instant invention. Typical of such materials are the alloys disclosed in U.S. Pat. Nos. 3,012,882 and 3,174,851 and Belgian Pat. No. 703,649, the disclosures of which are incorporated by reference herein. As is made clear in these patents, the alloys undergo a transition at a certain temperature which in the case of the gold-cadmium and silver-gold-cadmium alloys described in U.S. Pat. No. 3,012,882 is simply referred to as a phase change. The other patents describe the transition which takes place in the disclosed alloys as one between austenitic (or high temperature) and martensitic (low temperature) forms of material. Briefly, when the alloy is subjected to a deforming force in excess of its elastic limit, internal stresses are set up in the material. Those stresses can be relieved when a heat recoverable metallic material is passed downwardly through its transition temperature. The stress relief results in a distortion of the material, and the material will remain in the distorted state until it is passed upwardly through the transition temperature, at which time the material heat recovers. While heat recoverable metals exhibit a markedly lesser percent recovery than do polymeric materials, this infirmity can be obviated for present purposes by disposing the expanded, heat recoverable article in a configuration in which the edge portions are sufficiently separated to permit wrap-around application of the recoverable article to the substrate to be protected, yet sufficiently close to permit heat recovery to an overlapping, generally cylindrical configuration. As in the other embodiments of the invention, a second non-expanded lamina of polymeric or metallic material is provided as a restraint, urging the expanded lamina to an involute heat recovery. Heat recoverable metallic sleeves prepared according to the invention are particularly useful in high temperature applications, e.g., as solder sleeves, and can be used with conventional solder inserts and provided in conventional fashion with solder dams.

While the heat recoverable metals described above are particularly useful for high temperature application, they are by no means the sine qua non of solder sleeve and other high temperature employment. To the contrary, fluorocarbon polymers and other polymer candidates for high temperature application have been found suitable for use in the instant invention. Among such polymers can be mentioned, e.g., polyvinylidene fluoride (Dalvor $PVF_2$, available from Diamond Shamrock Corporation), tetrafluoroethylene-polyvinylidenefluoride copolymer; vinylidene fluoride-hexafluoro-propene copolymer (Viton, available from the duPont Company), and vinylidene fluoride-chlorotrifluoroethylene copolymer (Kel-F, available from Minnesota Mining & Manufacturing Company). In each instance, materials for the two principal laminae of the articles of the invention are paired in the fashions discussed above to best promote involute curling upon heat application.

Thus far, the articles of the invention have been referred to as recovering to an overlapping, generally cylindrical configuration. In other words, cross sections of the recovered article taken on planes perpendicular to its longitudinal axis will roughly correspond one to the other in shape and area. However, the term "generally cylindrical" does and is intended to encompass variations from a true cylinder which are due to radial inward recovery of the wrap-around sleeve such that the exterior surface of the recovered sleeve tends to conform to the irregularities of the substrate about which it is disposed, e.g., a wire splice or cable presenting an irregular exterior surface. In fact, that portion of the surface of the heat recoverable articles of the invention which ultimately abuts the surface of the protected substrate can be provided with a coating of grease, mastic or other material flowable at ordinary temperatures, so as the better to conform the inner wall of the ultimate recovered article to the irregularities of the protected substrate. For example, such a coating can be provided in heat recoverable articles intended for use as wrap-around sleeves for cable splices where as substantial amount of irregularity is present on the surface of the splice, the coating acting to inhibit corona discharge. Coatings flowable at ordinary temperatures and suitable for use in this invention are disclosed in U.S. Pat. No. 3,297,819, the disclosure of which is incorporated herein by reference. In general, the coating will act to discourage formation of a bond at interfaces formed during involute recovery by the presentation of polymer surfaces one to another. Accordingly, only that surface of the recovered article which will directly abut the substrate protected should be so coated. Of course, if for a particular reason it is desired that the flowable coating extend over a greater area of the surface of the recoverable article, there should yet be provided ample surface which is sufficiently free from interference by the flowable material that bonding can occur between adjacent layers in the recovered structure where bonding is considered essential in the particular employment.

The principle of involute heat recovery embodied in this invention finds particular application in the formation of heat recoverable closure devices of the sort wherein edge portions of a heat recoverable, wrap-around sleeve are joined to form a seam along the length of the sleeve. The closure device is especially useful in cases where the substrate to be protected is greater in radius than the radius of curl obtainable with commercially available thicknesses of involutely heat recoverable wrap-around sleeves, yet too small to justify the employment of clips, rods or other mechanical closure means. FIGS. 11–15 depict successive stages in the manufacture and recovery of closure devices provided according to the invention. In FIG. 11 there is shown an expanded, heat recoverable polymeric material 9, having laminated on opposite faces thereof at the opposite edge portions thereof layers 10 and 11 composed of relatively non-heat recoverable material selected according to the considerations discussed hereinabove such that upon heat recovery of adjoining portions of the layer 9, the layers 10 and 11 will act to restrain linear recovery and urge the recovery of layer 9 to proceed in involute fashion in a direction opposite the face to which the relatively non-heat recoverable layers have been laminated. Thus, in an initial stage of heat recovery wherein heat is applied only to the edge portions of the overall structure, the article assumes in cross-section the shape of an elongate S as apparent from FIG. 12. With reference now to FIGS. 13 and 14, the article so recovered can be deployed around a substrate (not shown) to be protected, the arcuate edge portions thereof positioned in interlocking relation as is generally indicated at 12, and heat applied to the interlocked edge portions causing them to further heat recover in the interspiraling fashion generally indicated at 13 to form a tight seam resistant to separation in service. The edge portions of the recoverable closure device can be treated or provided with means which enhance the adherability of one interlocking and interspiraling edge portion to the other in the manner heretofore discussed in connection with other embodiments of the invention, mutatis mutandis. The heat recoverability of the material 9 can be provided by the linear expansion of sheet material susceptible to impartation of elastic memory in conventional fashion. Alternatively, the material 9 may result from the longitudinal splitting and flattening out of a heat recoverable tube. In either case, following formation of the interspiraling seam 13, the entire closure sleeve can be subjected to heat, whereupon it recovers radially inward as shown in FIG. 15 to snugly seal and protect the substrate (not shown). Various additional refinements or equivalent structures will occur to the art-skilled in light of the above description. Thus, for example, the inner wall 14 of the closure device can be provided with a flowable coating in a manner like that discussed with reference to the other embodiments of the invention. Again, one arcuate edge portion can be formed simply by ross-linking the edge portion in that position rather tl n initially heat recovering the edge to an arcuate p ition. Thereafter, the other and involutely heat rec erable edge can be interlocked therewith and cause to heat recover in spiral fashion. However, the last-mentioned alternative is not preferred, it having been discovered that a more secure seam is formed where both edge portions are involutely heat recoverable. In any event, it will be seen from the above that there has been provided a closure means which requires no extraneous objects such as clips, rails and rods and which can be easily and conveniently manufactured and applied in sheet form.

The invention is further illustrated in the following specific examples, in which all parts and percentages are by weight unless otherwise specified, but it is to be understood that the invention is not to be limited to the details thereof.

EXAMPLE 1

Involute curling is attained by the employment of a laminate having two cross-linked laminae, one of which has been expanded prior to lamination.

A. Two 0.025 inch layers of Union Carbide DYNH low density polyethylene are cross-linked by exposure to 10 megarads of electron radiation. One of the cross-linked layers is heated to 150°C., stretched to twice its length and allowed to cool in the stretched position. One side of each layer is coated with 2,5-dimethyl-2,5-bi (tertbutylperoxy) hexane. The coated layers are positioned in a cold press with the coated sides facing one another and the press temperature cycled to 183°C for 10 minutes and back to room temperature under 5,000 pounds pressure. Upon application of heat at about 100°C–110°C the resultant laminate involutely curls upon itself, forming a spiral.

B. When Union Carbide DQD 1868 ethylene-vinyl acetate copolymer is substituted as either the stretched or non-stretched layer of part A, involute curling is similarly obtained.

C. Involute curling is similarly obtained upon the substitution of an 80:20 blend of Fortiflex A60-20R high density polyethylene and Union Carbide DPD 6169 ethylene-ethyl acrylate copolymer as either the stretched or non-stretched layer in part A.

D. Employment in the procedure of part A of identically dimensioned layers of DuPont Alathon 7050 high density polyethylene as the non-stretched layer, Union Carbide DQD 1868 as the stretched layer, and DuPont Elvax 210 ethylene-vinyl acetate copolymer as an adhesive melt fused to the outer face of the laminate adjacent the stretched layer resulted in involute curling on application of heat.

EXAMPLE 2

Involute curling is obtained by the employment of a laminate comprising a first lamina cross-linked and expanded according to Example 1, and a second uncross-linked layer having a melting point greater than that of the first lamina.

A. A 0.040 inch layer of Union Carbide DPD 6169 is cross-linked and expanded according to Example 1. An uncross-linked 0.020 inch layer of Phillips Marlex 6003 high density polyethylene is prepared. The melting point of the latter layer is greater than that of the former by about 40°C.

B. When the following materials are substituted in the procedure of part A, similarly curling laminates are obtained.

TABLE I

| Uncross-Linked Layer | Cross-Linked Expanded Layer |
| --- | --- |
| 1. polypropylene* | Union Carbide DQD 1868 ethylene-vinyl acetate copolymer |
| 2. DuPont Alathon 7050 high density polyethylene | Union Carbide DQD 1868 ethylene-vinyl acetate copolymer |
| 3. 80:20 and 20:80 blends of Phillips Marlex 6003 high density polyethylene and USI UE 645 ethylene-vinyl acetate copolymer | Union Carbide DYNH polyethylene, USI UF 645 ethylene-vinyl acetate copolymer, and blends thereof |
| 4. polypropylene | 50:50 blend of Union Carbide DYNH polyethylene and polypropylene |

*coated with 2,5-dimethyl-2,5-bis(tert-butylperoxy)hexane as in Example 1.

In case 1 above, the melting temperature of the uncross-linked layer is about 80°C greater than that of cross-linked layer. In case 2, the melting temperatures differ by 40°C.

EXAMPLE 3

Involute curling is obtained by the employment of a laminate comprising a first lamina cross-linked and expanded as in Example 1 and a second, uncross-linked lamina having a viscosity at the temperature of heat recovery substantially greater than that of the expanded, heat recoverable layer.

A. An uncross-linked 0.015 inch layer of Phillips Marlex TR 704 low density polyethylene containing 10% Cabot Cab-O-Sil HS-S fumed silica is laminated to a cross-linked expanded 0.025 inch layer of Phillips Marlex TR 906 low density polyethylene as in Example 2. Subsequent heating caused curling as in Examples 1 and 2.

B. When the following materials are substituted for the materials employed in part A, involutely curling laminates are similarly obtained.

TABLE II

| High Viscosity, Uncross-linked Layer | Cross-Linked Expanded Layer |
| --- | --- |
| 1. USI XC-69 ethylene-vinyl acetate copolymer | DuPont Elvax 250 ethylene-vinyl acetate copolymer |
| 2. USI XC-69 plus 10% Cabot Cab-O-Sil fumed silica | ..."... |
| 3. Phillip's Marlex 6001 high density polyethylene | DuPont Alathon 7050 high density polyethylene |
| 4. Diamond Shamrock Dalvar $PVF_2$ polyvinylidene fluoride, melt index=2 | Diamond Shamrock $PVF_2$ polyvinylidene fluoride, melt index = 22 |
| 5 DuPont Viton 098 vinylidene fluoride hexafluoropropene copolymer | ..."... |

EXAMPLE 4

Involute curling is obtained by employment of a laminate comprising a first lamina cross-linked and expanded according to Example 1, and a second cross-linked non-expanded lamina disposed on the first lamina by solution coating.

A. A solvent solution of Goodyear Vithane 100 cross-linked polyurethane in 50:50 dimethyl formamide:methyl ethyl ketone is applied to one side of a cross-linked expanded 0.025 inch layer of U.S.I. UE 645 ethylene-vinyl acetate copolymer. After evaporation of the solvent by gentle heating, the laminate is involutely curled by heating above 100°C.

B. Similar results are obtained where there is substituted for the expanded, cross-linked layer of part A (1) DuPont Alathon 3190 ethylene-vinyl acetate copolymer; or (2) blends of Phillips Marlex 6003 high density polyethylene and U.S.I. UE 645 ranging from 5:95 to 20:80.

EXAMPLE 5

A three-layer, involutely heat recoverable article is prepared by a process involving in situ polymerization of exterior laminae.

A. A 0.050 inch layer of Union Carbide DYNH low density polyethylene is coated on one side by brushing with trimethylolpropane trimethacrylate and irradiated 10 megarads with the coated side facing the electron beam. The layer is then expanded as in Example 1 and a second coating of trimethylolpropane trimethacrylate applied to the opposite side thereof and the sample again irradiated 5 megarads with the newly coated side facing the beam. Subsequent heating at 120°C caused formation of an involute curl.

The trifunctional monomer in each instance undergoes radiation-initiated polymerization and cross-linking. The coating so polymerized before expansion can be eliminated, but is included above to increase the modulus of the material expanded. Of course, the first irradiation also cross-links the polyethylene itself. Upon irradiation of the second monomer coating, a non-expanded cross-linked layer of polymer is provided and acts to restrain the heat recoverable laminae from recovering in linear as opposed to involute fashion. A lesser dosage of radiation is employed to avoid "override" of the memory of the previously irradiated laminae.

B. Similar results are obtained when the polyethylene material of part A is replaced by DuPont Alathon 3170 ethylene-vinyl acetate copolymer or Phillips Marlex 6003 high density polyethylene.

EXAMPLE 6

Samples of Thermofit SCL tubing generally corresponding to that prepared in the example of British Pat. No. 1,033,959 are obtained from Raychem Corporation in 0.5 inch, 0.75 inch and 1.0 inch sizes. The samples, briefly described, are of expanded two layer low density polyethylene tubing, the outer layer being a relatively infusible cross-linked polyethylene, the inner layer being an uncross-linked, meltable polyethylene. Each sample is longitudinally split, flattened out and the "inner" meltable side exposed to 40 megarads of electron radiation. Upon the application of heat, the restraint of the material originally constituting the inner wall of the SCL tubing occasions involute recovery of the material originally constituting the outer wall of the tubing, such that the latter becomes the inner wall of the recovered article.

EXAMPLE 7

This example demonstrates production of an involutely heat recoverable article by the addition in solvent solution of a polymer to an already cross-linked and expanded lamina. A layer of partially cross-linked polyurethane resin (B. F. Goodrich Vithane 100 polyurethane) is disposed on each of three substrate expanded layers by addition in 50:50 dimethyl formamide:methyl ethyl ketone (40% solids) solution, with gentle heating to remove solvent. The expanded layers result from expansion to twice original length and 10 megarads irradiation of 0.025 inch thicknesses of:

TABLE III

| Substrate No. | 1 | 2 | 3 |
|---|---|---|---|
| | | Parts By Weight | |
| Phillips Marlex 6003 high density polyethylene | — | 4.61 | 9.23 |
| U.S.I. UE 645 ethylene-vinyl acetate copolymer | 100 | 86.66 | 83.04 |
| Antioxidant | — | 5.88 | 5.88 |
| Triallyl cyanurate cross-linking agent | — | 1.85 | 1.85 |

In each instance, further application of heat produces in integrally bonded involutely recovered article.

EXAMPLE 8

The following polymer compositions are employed in forming a dual walled tube which is then adapted for use as an involutely heat recoverable article.

TABLE IV

| Tube Inner Wall Component | Parts | Tube Outer Wall Component | Parts |
|---|---|---|---|
| Union Carbide DYNH low density polyethylene | 90.0 | Marlex 6003 high density polyethylene | 94.0 |
| Union Carbide DFD 6169 ethylene-ethyl acrylate copolymer | 7.0 | Union Carbide DPD 6169 ethylene-ethyl acrylate copolymer | 4.8 |
| Santonox R* | 0.2 | Santonox R* | 1.2 |
| Antioxidant (dilauryl thiodipropionate) | 0.8 | | |
| Cross-linking agent (triallyl isocyanurate) | 2.0 | | |

*4,4' thiobis(6-t-butyl-m-cresol), an anti-oxidant and anti-rad.

The inner wall composition is extruded to form a substrate tubing of 0.150 inch I.D. and 0.015 inch wall thickness, and the extruded substrate subjected to 10 megarads electron radiation. The outer wall composition is then extruded onto the irradiated substrate to provide a 0.010 inch outer wall while maintaining the 0.150 inch I.D. with pressurized air. The resulting double-walled tube is then heated to above the crystalline melting temperature of both wall compositions, expanded according to the process of U.S. Pat. No. 3,086,242, and cooled in the expanded position. As compared to the outer wall composition, the inner wall has a low crystalline melting temperature. Accordingly, when the resulting tube is longitudinally split and heated to a temperature between the crystalline melting temperature of the two walls, the outer wall composition acts to restrain linear recovery and the article involutely recovers to a closed spiral in which the low melting composition constitutes, again, the inner wall. As a variant of this example, a light dose of radiation, e.g., 5 megarads, can be applied to the outer wall after expansion but prior to heat recovery. The cross-linking of the outer wall in expanded position provides additional restraint against linear recovery of the inner, heat recoverable wall. The relatively greater susceptibility of the high density polyethylene to cross-linking permits use of a light dose for this purpose. This, in addition to the radiation attenuating effect of the interposed outer wall and outer wall and the optional inclusion of antirads therein permits sufficient cross-linking to occur without overriding the elastic memory which has been imparted to the inner wall. If desired, an adhesive coating can be applied to one or both of the inner and outer walls before or after tube splitting to enhance adhesion of the wraps forward on recovery, one to another.

EXAMPLE 9

A heat recoverable closure article is prepared, precurled to an elongate S-shaped configuration, interlocked at the edge portions thereof, and heat recovered. One layer is formed of a 20:4:4 blend of Union Carbide DOD 1868 ethylene-vinyl acetate copolymer: Nylon 12:Marlex 5202 polyethylene. The layer, which has an original thickness of 0.050 inch is subjected to 10 megarads radiation and expanded to twice its length. The expanded strip is 8.0 inches in width. At opposite edge portions thereof on opposite primary faces are bonded 0.025 inch thick strips of non-expanded material in respective widths of 2.25 inches and 1.5 inch. The non-expanded material is a polyamide prepared from a dimer acid (General Mills — Milvex 1535). The finished thickness of the edge portions is 0.030 inch.

The edge portions are precurled by light application of heat and the article then placed in a generally cross-sectionally circular configuration like that shown in FIG. 13, the edge portions being in interlocking relation as shown. Upon further application of heat to the outside curl, the interlocked edge portions involutely recover in the interspiraling fashion generally shown in FIG. 14. The outside curl completes approximately one full revolution, the inside curl revolving to a somewhat lesser extent. Because it revolves to a greater extent, the edge portion constituting the outside curl is preferably, as in this example, endowed with a wider portion of non-expanded material. Further, generalized application of heat causes the resultant closure to recover radially inwardly, the interspiraled edge portions resisting separation.

In the following examples, the effect of radiation dose, thickness of recoverable (moving) and non-recoverable (stationary) layers, and expansion ratio an involute curling in demonstrated.

In each case DPD 6169 ethylene-ethylacrylate copolymer irradiated as stated was employed. 6 inch by 3 inch slabs were placed in a jig and heated at 150°C in glycerine for one minute, then expanded to form the moving layer. The expanded slabs were laminated to unexpanded slabs by placing laid up slabs in a cold press at 5000 pounds line pressure, raising temperature to 125°C and pressure to 10,000 pounds. Cooling water was then turned on. In each case, a small parting strip was placed between the layers at one corner of each lay up before lamination so that final thickness of each layer could be measured.

From the laminates so formed, 2 inch by ½ inch strips were cut and curled. Strips were supported at the middle of one long edge by a pair of fine pointed pliers and dipped in glycerine until cooling occurred, then cooled immediately in cold water.

EXAMPLE 10

The effects of varying the dose of the moving layer with the stationary layer at constant dose, and varying the dose of the stationary layer with the moving layer at constant dose were examined. Modulus vs. dose was determined first.

TABLE V

| DOSE (Mrads) | $M_{100}$ at 150°C (psi) |
|---|---|
| 0 | 0 |
| 2 | 0 |
| 4 | 0 |
| 6 | 0 |
| 9 | 0 |
| 12 | 8 |
| 15 | 12 |
| 30 | 52 |
| 45 | 101 |
| 60 | 141 |
| 75 | 220 |
| 90 | 260 |
| 105 | 293 |
| 120 | 369 |
| 135 | 405 |

A. The following data was then taken for specimens as between whom radiation dosage of the moving layer was held constant while that of the stationary layer varied:

TABLE VI

| SPECIMEN NO: | 1 | 2 | 3 | 4 | 5 | 6 | 7 | 8 | 9 | 10 |
|---|---|---|---|---|---|---|---|---|---|---|
| Dose of Moving Layer (Mrads) | 30 | 30 | 30 | 30 | 30 | 30 | 30 | 30 | 30 | 30 |
| Dose of Stationary Layer (Mrads) | 0 | 15 | 30 | 45 | 60 | 75 | 90 | 105 | 120 | 135 |
| Expansion Ratio | 2X | 2X | 2X | 2X | 2X | 2X | 2X | 2X | 2X | 2X |
| Moving Layer Thickness of Laminates (in) | 0.032 | 0.032 | 0.032 | 0.032 | 0.032 | 0.032 | 0.032 | 0.032 | 0.032 | 0.032 |
| Thickness of Moving Layer (in) | 0.014 | 0.014 | 0.014 | 0.014 | 0.014 | 0.014 | 0.014 | 0.014 | 0.014 | 0.014 |
| Thickness of Stationary Layer (Inches) | 0.018 | 0.018 | 0.018 | 0.018 | 0.018 | 0.018 | 0.018 | 0.018 | 0.018 | 0.018 |
| Curling Behavior | Curled | Curled | Curled | Curled | Curled | Curled | Curled | Curled | Curled | Loose Spiral |
| Number of Wraps | 2-1/6 | 3-1/3 | 2-3/4 | 2-1/3 | 2-1/3 | 2-1/3 | 2-1/3 | 2-1/3 | 2-1/3 | — |
| OD of Curl (in) | 0.244 | 0.270 | 0.267 | 0.281 | 0.292 | 0.304 | 0.306 | 0.300 | 0.317 | — |
| Final length of Opened Out Specimen (in) | 1.2 | 1.3 | 1.5 | 1.5 | 1.6 | 1.7 | 1.7 | 1.75 | 1.75 | 1.9 |

The gradually decreasing degree of recovery in length had little effect on curling behavior except to increase the overall diameter of the curled specimens. Only at the highest dose level on the stationary layer was recovery reduced to a sufficient extent to prevent curling.

B. The following data was taken for specimens as between whom radiation dosage of the moving layer was varied while that of the stationary layer was held constant:

TABLE VII

| SPECIMEN NO: | 1 | 2 | 3 | 4 | 5 | 6 | 7 | 8 | 9 | 10 |
|---|---|---|---|---|---|---|---|---|---|---|
| Dose of Stationary Layer (Mrads) | 0 | 0 | 0 | 0 | 0 | 0 | 0 | 0 | 0 | 0 |
| Dose of Moving Layer (Mrads) | 0 | 2 | 4 | 6 | 9 | 12 | 15 | 30 | 45 | 60 |
| Expansion Ratio Moving Layer | 2X | 2X | 2X | 2X | 2X | 2X | 2X | 2X | 2X | 2X |
| Thickness of Laminate (in) | 0.032 | 0.032 | 0.032 | 0.032 | 0.032 | 0.032 | 0.032 | 0.032 | 0.032 | 0.032 |
| Thickness of Moving Layer (Inches) | 0.014 | 0.014 | 0.014 | 0.014 | 0.014 | 0.014 | 0.014 | 0.014 | 0.014 | 0.014 |
| Thickness of Stationary Layer (In) | 0.018 | 0.018 | 0.018 | 0.018 | 0.018 | 0.018 | 0.018 | 0.018 | 0.018 | 0.018 |
| Curling Behavior | No Curl | No Curl | No Curl | Tube Shape | Curl at one end | Curled | Curled | Curled | Curled | Curled |
| Number of Wraps | — | — | — | — | — | 2 | 2 ⅓ | 2 ⅓ | 2 ½ | 2 ⅓ |
| OD of Curl (in) | — | — | — | — | — | 0.275 | 0.275 | 0.257 | 0.264 | 0.285 |
| Final Length of Opened out Specimen (in) | 1.9 | 1.9 | 1.8 | 1.6 | 1.45 | 1.35 | 1.2 | 1.3 | 1.3 | 1.3 |

Only the very lightest doses on the moving layer failed to produce curling. Once curling occurred increasing the dose did not change the curling behavior.

EXAMPLE 11

The effect of varying the thickness first of the moving layer, then of the constant layer was investigated.

A. Thickness of moving layer varied.

10 percent recovery producing such good curling behavior. Presumably on unrolling the curled speciment for measurement the thin layer stretches.

Sample Number 8 bent to a horseshoe shape. Since its recovery in length is high and since the next set of results suggests that the ratio of the thicknesses is not the cause of failure, it seems that it is the total thickness of the laminate relative to its length which most influences curling behavior.

TABLE VIII

| SPECIMEN NO: | 1 | 2 | 3 | 4 | 5 | 6 | 7 | 8 |
|---|---|---|---|---|---|---|---|---|
| Dose of Moving Layer (Mrads) | 30 | 30 | 30 | 30 | 30 | 30 | 30 | 30 |
| Dose of Stationary Layer (Mrads) | 30 | 30 | 30 | 30 | 30 | 30 | 30 | 30 |
| Expansion Ratio (Moving Layer) | 2X | 2X | 2X | 2X | 2X | 2X | 2X | 2X |
| Thickness of Laminate (in) | 0.022 | 0.023 | 0.026 | 0.030 | 0.036 | 0.046 | 0.059 | 0.070 |
| Thickness of Stationary Layer (in) | 0.020 | 0.020 | 0.020 | 0.020 | 0.020 | 0.020 | 0.020 | 0.020 |
| Thickness of Moving Layer (in) | 0.002 | 0.003 | 0.006 | 0.010 | 0.016 | 0.026 | 0.039 | 0.050 |
| Curling Behavior | Curled | Curled | Curled | Curled | Double Curl | Double Curl | Curled | No curl |
| OD of Curl (in) | 0.269 | 0.250 | 0.269 | 0.272 | — | — | 0.387 | — |
| Number of Wraps | 2 ⅔ | 2 ½ | 2 ½ | 3 | — | — | 1 ⅓ | — |
| Final Length of Opened Out Specimen (in) | 1.9 | 1.9 | 1.9 | 1.8 | 1.6 | 1.5 | 1.5 | 1.4 |

The small shrinkages indicated for numbers 1 to 4 may be misleading, since it is hard to imagine a mere B. Thickness of Stationary Layer Varied:

TABLE IX

| SPECIMEN NO: | 1 | 2 | 3 | 4 | 5 | 6 | 7 | 8 | 9 | 10 |
|---|---|---|---|---|---|---|---|---|---|---|
| Dose of Moving Layer (Mrads) | 30 | 30 | 30 | 30 | 30 | 30 | 30 | 30 | 30 | 30 |
| Dose of Stationary Layer (Mrads) | 30 | 30 | 30 | 30 | 30 | 30 | 30 | 30 | 30 | 30 |
| Expansion Ratio Moving Layer | 2X | 2X | 2X | 2X | 2X | 2X | 2X | 2X | 2X | 2X |
| Thickness of Laminate (in) | 0.015 | 0.0165 | 0.018 | 0.019 | 0.020 | 0.028 | 0.032 | 0.049 | 0.066 | 0.110 |
| Thickness of Stationary Layer (in) | 0.001 | 0.0025 | 0.004 | 0.005 | 0.006 | 0.014 | 0.018 | 0.035 | 0.052 | 0.096 |
| Thickness of Moving Layer (in) | 0.014 | 0.014 | 0.014 | 0.014 | 0.014 | 0.014 | 0.014 | 0.014 | 0.014 | 0.014 |
| Curling Behavior | No Curl | Curled | Curled | Curled | Curled | Curled | Curled | Double Curl | Curled | No Curl |
| OD of Curl (in) | — | 0.280 | 0.19 | 0.22 | 0.239 | 0.257 | 0.255 | — | 0.458 | — |
| Number of Wraps | — | 1-1/5 | 2-2/3 | 2-2/3 | 2-1/2 | 2-1/3 | 2-1/3 | — | 1-1/2 | — |
| Final Length of Opened Out Specimen (in) | 1.0 | 1.0 | 1.2 | 1.4 | 1.5 | 1.4 | 1.5 | 1.6 | 1.7 | 2.0 |

No curl is produced when the stationary layer is either very thick or very thin. Numbers 1 and 10 both bent to horseshoe shapes.

EXAMPLE 12

The effect of expansion ratio on curling is next investigated. With the specimens employed, no curling was obtained where expansion ratio was less than about 1.25, as will appear from the following:

TABLE X

| SPECIMEN NO: | 1 | 2 | 3 | 4 | 5 |
|---|---|---|---|---|---|
| Dose of Moving Layer (Mrads) | 30 | 30 | 30 | 30 | 30 |
| Dose of Expanded Layer (Mrads) | 30 | 30 | 30 | 30 | 30 |
| Expansion Ratio (Moving Layer) | 1.25X | 1.5X | 2X | 2.5X | 3X |
| Total Laminate Thickness (in) | 0.040 | 0.040 | 0.037 | 0.037 | 0.035 |
| Thickness of Stationary Layer (in) | 0.020 | 0.020 | 0.020 | 0.020 | 0.020 |
| Thickness of Moving Layer (in) | 0.020 | 0.020 | 0.017 | 0.017 | 0.015 |
| Curling Behavior | No curl | Curled | Curled | Curled | Curled |
| OD of Curl (in) | — | 0.350 | 0.298 | 0.287 | 0.265 |
| Number of Wraps | — | 2 | 2 ⅓ | 2 ½ | 2 ⅔ |
| Final Length of Opened Out Sample (in) | 1.8 | 1.8 | 1.6 | 1.5 | 1.5 |

In the foregoing examples, certain materials designated in part by tradename are further identified as follows:

TABLE XI

| Material | Density | Melt Index | Comonomer % |
|---|---|---|---|
| A60-20R | 0.960 | 0.2 | |
| Alathon 3170 | 0.940 | 2.5 | 18 (vinyl acetate) |
| Alathon 3190 | — | 2.0 | 25 (vinyl acetate) |
| Alathon 7050 | 0.959 | 15 | |
| DYNH | 0.920 | 2.0 | |
| DPD 6169 | 0.931 | 6.0 | — |
| DOD 1868 | 0.943 | 2.5 | 18 (ethyl acrylate) |
| Elvax | 0.951 | 340–470 | 28 (vinyl acetate) |
| Marlex TR 704 | 0.917 | 0.4 | |
| Marlex TR 906 | 0.916 | 22 | |
| Marlex 6001 | 0.96 | 0.1 | |
| Marlex 6003 | 0.96 | 0.3 | |
| UE 645 | — | — | 28 (vinyl acetate) |
| XC | 0.94 | 0.3 | 18 (vinyl acetate) |

What is claimed is:

1. A laminar article having two primary faces and comprising first, second and third thermoplastic laminae which have been crosslinked chemically or by irradiation, said second and third laminae being laminated respectively to opposite edge portions of the opposite faces of said first lamina, said first lamina having been rendered heat recoverable by expansion in its crosslinked state whereas relative to said first lamina said second and third laminae lack heat recoverability, said article being heat recoverable to a configuration describing an elongate S in cross section.

2. An article according to claim 1 which has been heat recovered to a configuration describing an elongate S in cross-section.

3. An article according to claim 1 in which the edge portions comprising in cross-section the arcuate end-portions of said S are positioned in interlocking relation and further heat recovered in interspiraling fashion to form a separation resistant closure.

4. A method of forming a heat recoverable wrap-around closure having first, second and third laminae of thermoplastic material which has been crosslinked chemically or by irradiation, which method comprises laminating second and third laminae respectively to opposite edge portions of the opposite faces of a first lamina which has been rendered heat recoverable by expansion in its crosslinked state and before or following the step of lamination, crosslinking the second and third laminae, said second and third laminae being non-heat recoverable relative to said first lamina such that the resulting closure is heat recoverable to an elongate S in cross-section and, upon interlocking the arcuate end-portions of said S is further heat recoverable in interspiraling fashion to form a separation resistant closure.

* * * * *